US009413982B2

(12) United States Patent
Tan et al.

(10) Patent No.: US 9,413,982 B2
(45) Date of Patent: Aug. 9, 2016

(54) SYSTEM AND METHOD FOR VIDEO FRAME SEQUENCE CONTROL

(75) Inventors: Kar-Han Tan, Sunnyvale, CA (US);
Irwin E Sobel, Menlo Park, CA (US);
Mehrban Jam, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

(21) Appl. No.: 14/373,512

(22) PCT Filed: Feb. 28, 2012

(86) PCT No.: PCT/US2012/027004
§ 371 (c)(1),
(2), (4) Date: Jul. 21, 2014

(87) PCT Pub. No.: WO2013/130051
PCT Pub. Date: Sep. 6, 2013

(65) Prior Publication Data
US 2014/0375664 A1    Dec. 25, 2014

(51) Int. Cl.
*H04N 5/235* (2006.01)
*H04N 5/74* (2006.01)
*H04N 5/262* (2006.01)
(Continued)

(52) U.S. Cl.
CPC ............... *H04N 5/2357* (2013.01); *G09G 5/39* (2013.01); *H04N 5/04* (2013.01); *H04N 5/222* (2013.01); *H04N 5/232* (2013.01); *H04N 5/262* (2013.01);
(Continued)

(58) Field of Classification Search
CPC .................................................. H04N 5/2357
See application file for complete search history.

(56) References Cited

U.S. PATENT DOCUMENTS 7,583,302 B2     9/2009   Hoshino
2001/0053275 A1  12/2001  Adachi et al.
(Continued)

FOREIGN PATENT DOCUMENTS

CN    102196290      9/2011
JP    2003-087601    3/2003
WO    WO-2011071465  6/2011

OTHER PUBLICATIONS

English translation (machine-generated) of Abstract of Chinese Patent Publication No. 102196290 [retrieved Jul. 16, 2014], Retrieved from the Internet: <http://worldwide.espacenet.com/publicationDetails/biblio?CC=CN&NR=102196290A&KC=A&FT=D&ND=&date=20110921&DB=EPODOC&locale=en_EP>.
(Continued)

*Primary Examiner* — Joni Richer
*Assistant Examiner* — Grace Q Li
(74) *Attorney, Agent, or Firm* — HP Inc Patent Department

(57) ABSTRACT

A video sequence control system that includes an input video frame buffer and an output video frame selection component is described. The input video frame buffer receives input video frames from a video source. The output video frame selection component determines the video frame to be output according to a scheduler that provides timing information and modulation information. The timing information includes information regarding when a video frame will be output. The modulation information varies dependent upon the frame types available to be output, wherein the available frame types include at least image frames from the input video frame buffer and functional frames, wherein the at least image frames and functional frames are output according to a pattern defined by the scheduler. In addition based on the timing information, a synchronization output signal is output corresponding to the output of the functional frame.

13 Claims, 9 Drawing Sheets

(51) Int. Cl.
*H04N 5/232* (2006.01)
*H04N 5/222* (2006.01)
*H04N 5/04* (2006.01)
*G09G 5/39* (2006.01)
*H04N 9/475* (2006.01)

(52) U.S. Cl.
CPC ............... H04N 5/74 (2013.01); H04N 9/475 (2013.01); *G09G 2360/18* (2013.01)

(56) References Cited

U.S. PATENT DOCUMENTS

| | | | |
|---|---|---|---|
| 2005/0017939 A1* | 1/2005 | Sato | G09G 3/3611 345/89 |
| 2008/0001881 A1* | 1/2008 | Baba | G09G 3/3406 345/89 |
| 2009/0243995 A1 | 10/2009 | Kimura | |
| 2011/0025726 A1* | 2/2011 | Tatsumi | G09G 3/2025 345/690 |
| 2011/0096146 A1 | 4/2011 | Hulyalkar et al. | |
| 2011/0187840 A1* | 8/2011 | Chao | H04N 13/04 348/53 |
| 2011/0228048 A1 | 9/2011 | Wei et al. | |
| 2011/0234777 A1 | 9/2011 | Kobayashi et al. | |
| 2012/0026286 A1 | 2/2012 | Wang | |
| 2012/0098825 A1* | 4/2012 | Tseng | G09G 3/003 345/419 |
| 2012/0189212 A1* | 7/2012 | Ren | G06T 7/0038 382/218 |
| 2013/0077057 A1* | 3/2013 | Kurashige | G02B 5/0252 353/31 |

OTHER PUBLICATIONS

English translation (machine-generated) of Abstract of Japanese Patent Publication No. 2003087601 [retrieved Jul. 16, 2014], Retrieved from the Internet: <http://worldwide.espacenet.com/publicationDetails/biblio?CC=JP&NR=2003087601A&KC=A&FT=D&ND=3&date=20030320&DB=EPODOC&locale=en_EP>.

Grundhofer, et al. "Dynamic adaptation of projected imperceptible codes." In Mixed and Augmented Reality, 2007. ISMAR 2007. 6th IEEE and ACM International Symposium on, pp. 181-190. IEEE, 2007.

International Search Report and Written Opinion, Nov. 12, 2012, PCT Patent Application No. PCT/US2012/027004.

Izadi et al. "Going beyond the display: a surface technology with an electronically switchable diffuser." In Proceedings of the 21st annual ACM symposium on User interface software and technology, pp. 269-278. ACM, 2008.

Kuechler, et al. "Holoport—a device for simultaneous video and data conferencing featuring gaze awareness." In Virtual Reality Conference, 2006, pp. 81-88. IEEE, 2006.

* cited by examiner

SYSTEM AND METHOD FOR VIDEO FRAME SEQUENCE CONTROL

CROSS-REFERENCE TO RELATED APPLICATION

This application is a U.S. National Stage Application of and claims priority to International Patent Application No. PCT/US2012/027004, filed on Feb. 28, 2012, and entitled "SYSTEM AND METHOD FOR VIDEO FRAME SEQUENCE CONTROL".

BACKGROUND

When displaying a projected image and simultaneously capturing images of the projected scene and the display, there can be crosstalk between the projected images and the captured content. The crosstalk can reduce the image quality (i.e. brightness, color) of the captured image frames and additionally cause distracting flicker on the display. Various attempts have been made to reduce crosstalk in the projection/image capture systems. For example, the display may be changed from a passive screen display screen an active switchable diffuser to reduce crosstalk. However, although crosstalk may be reduced when using the active switchable diffuser for the display, an active diffuser display screen can limit the useful duty cycle of both the projector and the image capture device used in the system.

BRIEF DESCRIPTION OF DRAWINGS

The figures depict implementations/embodiments of the invention and not the invention itself. Some embodiments are described, by way of example, with respect to the following Figures.

Figure 1:
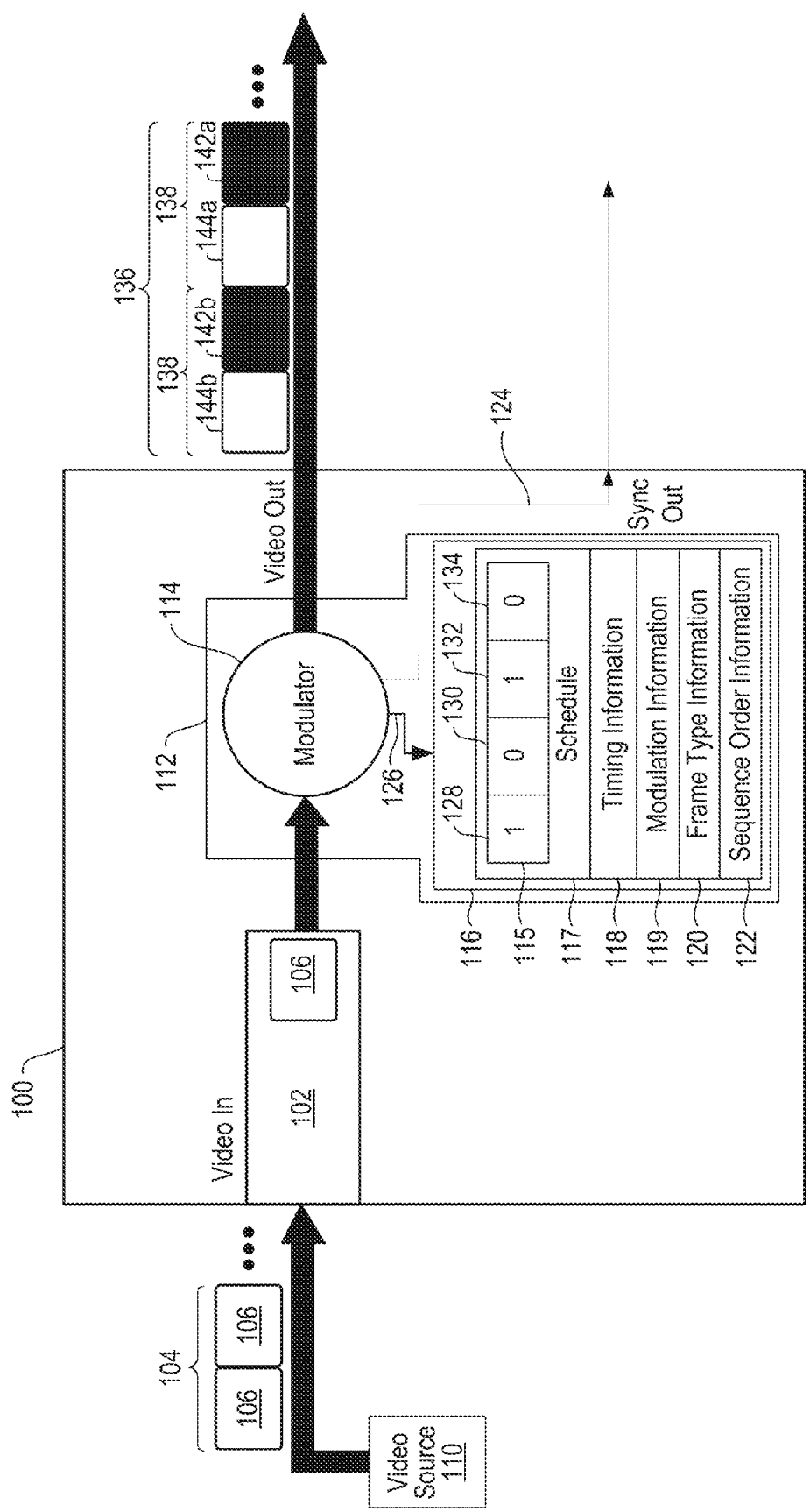
FIG. 1 shows a schematic drawing of a video sequence control system with binary modulation according to an example of the invention.

The drawings referred to in this Brief Description should not be understood as being drawn to scale unless specifically noted.

DETAILED DESCRIPTION OF THE EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

The application describes a video sequence control system 100 comprising: an input video frame buffer 102 for receiving a video stream 104 of video frames 106 from a video source 110; and an output video frame selection component 112 for determining a video frame to be output according to a scheduler 116 that provides timing information 118 and modulation information 119, wherein the timing information 118 includes information regarding when each video frame will be output, wherein modulation information varies dependent upon frame type to be output, wherein frame type includes at least the image frames from the input video frame buffer and functional frames, wherein the at least the image frames and functional frames are output according to a pattern defined by the scheduler, wherein based on the timing information 118 a synchronization output signal 124 is output corresponding to the output of the functional frame.

Figure 2:
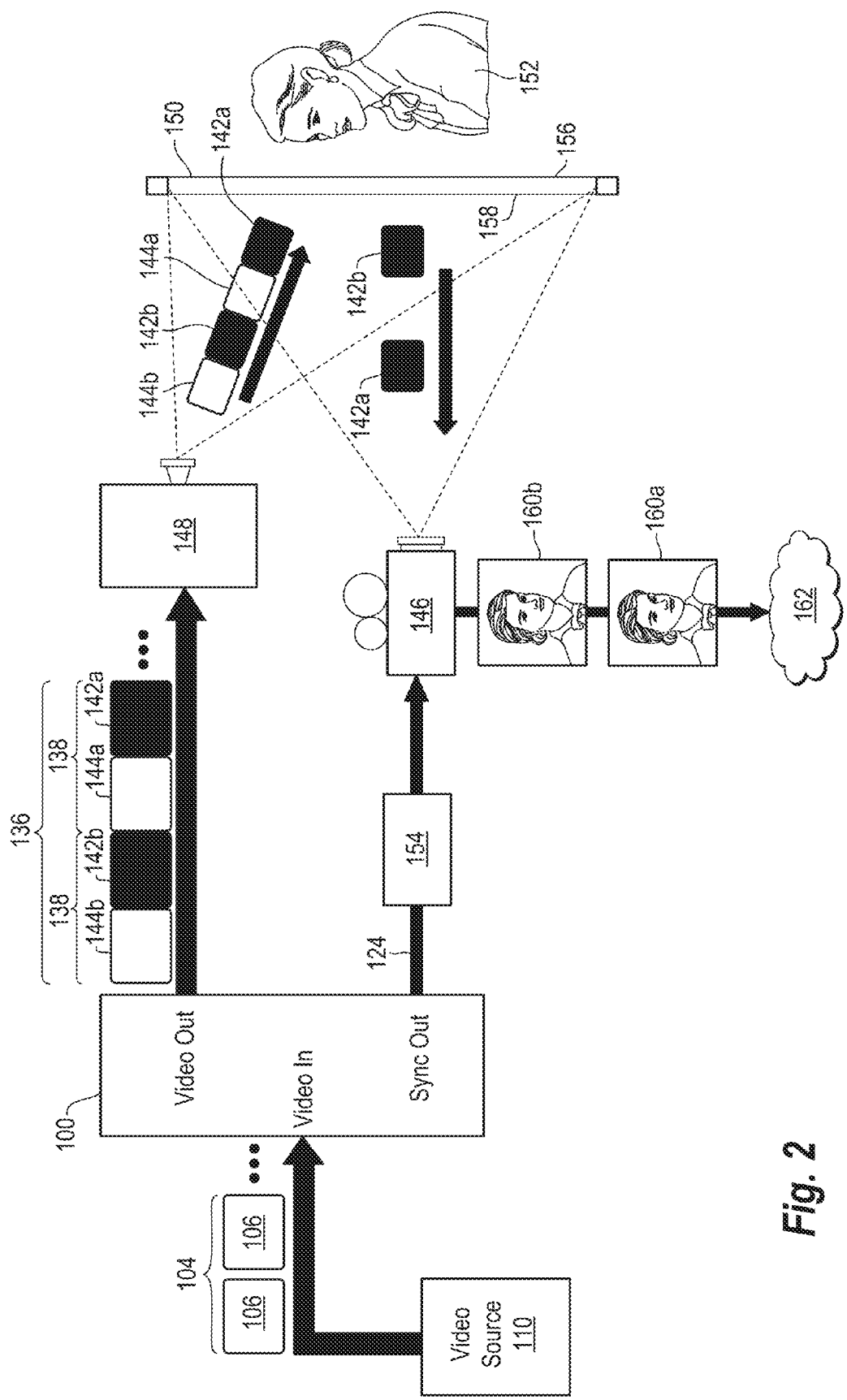
FIG. 2 shows the video sequence control system shown in FIG. 1 where the video frame sequence frames produced and output by the video sequence control system is displayed on a see-through display screen according to an example of the invention.

The video sequence controller takes a video stream input from a video source and outputs a (1) modified video stream and (2) a synchronization output signal. Referring to FIG. 2, the video sequence control system 100 receives a video stream 104 from the video source at a first rate. The video sequence controller 100 receives the input video stream, modifies the video stream and outputs the modified video stream 136 at a second frame rate. In one example, the modification of the video stream occurs based on a schedule 117 that details the insertion a functional video frame into the output video stream 136.

Whether an input frame or other frame is modified to create the video output stream and how frames slotted for modification are changed is dependent upon frame type. At least two frame types are available for output, including input video frames and functional frames. Input video frames refer to the input video that are not modified and directly output in the output video frame sequence. The functional frames are frames other than the input video frames. The functional video frames often have a purpose other than the output of video images. For example, in the implementation described in FIGS. 1, 2 and 3A the functional video frames are crosstalk reduction frames. The crosstalk reduction frames are added for the purpose of reducing crosstalk in the system in order to improve image quality. In the example shown in FIGS. 3B and 3D, the functional frames are color channel varying frames. In one example, the purpose of varying the color channel is to add color channel varying frames to the output video stream to facilitate green-screening. Throughout the application, the term functional frame and the alternative functional description of the frame (i.e., crosstalk reduction frame, color channel varying frame) may be used interchangeably according to the implementation.

FIG. 1 shows a schematic drawing of a video sequence control system 100 according to an example of the invention. The video sequence control system includes an input video frame buffer 102 for receiving a video stream 104 of video frames 106 from a video source 110. Various sources may be used for the generating the input video stream 104. For example, video could originate from video streamed from the network. In another example, the video source could be a graphics adapter in a computing device. In another example, the video source could be a video camera that inputs the captured images to the graphics adapter in a computing device.

Referring to FIG. 1, the video sequence control system 100 includes an output video frame selection component 112 for determining the video frame to be output according to a scheduler 116. In one example, the output video frame selection component 112 includes a modulation component 114 that modifies the input video stream that is coupled to a scheduler 116. Timing information 118 is used by the output selection component 112 to determine the timing of when video frames are output. Modulation information 119 in the scheduler 116 can be used by the modulation component 114 to determine whether the input video frame needs to be modified and if the video frame needs to be modified which input video frames are modified and how the video input frames selected for modification are modified before being output.

For the example shown in FIG. 1, how the input video stream is modified and the resultant video stream output is dependent upon the output video frame selector schedule 117. Referring to FIG. 1 shows a visual representation 115 of the video frame output schedule 117. In the example shown in FIG. 1, the output video frame selection component 112 can be described as a binary modulator. In one implementation of a binary modulator, the number 1 can be representative of the image frame and the number 0 can be representative of the black crosstalk reduction frame. Alternatively, the number 1 can be representative of a black crosstalk reduction frame and the number 0 can be representative of the input image frame. In one example, the arrow 126 represents a schedule pointer that points to a frame that is under consideration (to be modified/output) according to the output video frame schedule 117.

Assume for purposes of example, that the number 0 in the schedule is representative of an image frame and that the number 1 is representative of the black crosstalk reduction frame. In the example shown in FIG. 1, when the pointer of the selection component points to an image frame (represented by a 0 in the schedule), the output video frame selection component 112 selects an image frame for output. However, for the case where the pointer is pointing to the functional frame (the crosstalk reduction frame) in the schedule, the modulator changes the image in the input file according to the modification information in the schedule. Referring to FIG. 1 where the modulation schedule specifies a black crosstalk video frame—the modulator modifies the image component frame so that the pixels in the image frame are black. The selection component then outputs the modified image frame.

In an alternative example, instead of the modulator modifying each pixel of the corresponding image frame, a software or hardware implemented representation of the crosstalk reduction frame is used. For example, say for a black (crosstalk reduction) frame is required for every pixel in the video frame. The pixel value of zero could be stored and the value repeated for each pixel location in the video frame when a black frame is present on the schedule. For this case, the entire image frame may not need to be stored. In one case a single pixel value is stored. The timing information in the schedule can be used to determine when the crosstalk reduction frame is to be output. When the crosstalk reduction frame is output, the pixel value of zero is repeated for every pixel in the frame.

The scheduler 116 of the output video frame selection component 112 includes timing information 118 and modulation information 119. In one example, the timing information 118 includes information regarding when each video frame will be output. For example, timing information 119 includes information about the number of frames to be output within a certain time period and when each frame in the scheduled sequence of video frames will be output. In one example, the scheduler determines the output sequence of the video frames at least in part based on the of the frame rate of the video input and the required video output. Thus for example, if the frame rate of the video source is 30 Hz and the required video output is 120 Hz, then for each video input image frame—four video frames are output. In the example shown in FIG. 1, the schedule 117 alternates between image frames (frames 130 and 134) and crosstalk reduction frames (frames 128 and 132). Thus for each image frame in the video input buffer a crosstalk reduction frame is output. This pattern (alternating image and crosstalk frames) is illustrated in the virtual representation 115 of the schedule and the corresponding video output sequence 136. The video frames are output at equal time periods. Thus, for a 120 Hz output, a frame is output every 0.25 seconds.

Referring to FIG. 1, the video sequence control system 100 receives the video source input at a first frame rate and outputs a modified video stream at a second frame rate. In one example, where the video sequence control system 100 is outputting video at a higher frame rate than the video input, the video output video frame selection component 112 repeats unmodified input image frames 106 and inserts the unmodified image frames into the output video stream 136 to accomplish the required frame rate. Where the video sequence control system 100 is outputting video at the same frame rate than the input video or lower, in one example frames are dropped (lower frame rate) or alternatively some of the existing frames (i.e. same frame rate) are dimmed. In one example, by dimmed we mean that the functional (i.e. crosstalk reduction frame) has an intensity lower than the corresponding input image frames in the same video sequence. The dimmed image can be a reduced intensity version of the black frame (i.e. a gray frame) or alternatively, a dimmed version of the image frame.

The frame rate and the video sequence pattern (sequence of frame types) effects whether the input video frames are dropped, inserted or remain the same in the output video frames 136. For the video sequence pattern shown in the visual representation of the schedule 117 in FIG. 1 for example, the schedule pattern includes an alternating sequence of image video frames from the input video stream 104 and crosstalk reduction frames, where the crosstalk are dimmed (black) video frames. If the input video streams and output video streams are both 60 Hz, then in one example, half of the video input frames could be modified (dimmed) to provide the video sequence pattern (alternating image and crosstalk reduction frames) shown on the visual representation 115 of the schedule.

In one example, the scheduler 116 includes frame type information 120, that provides information regarding the type of video frame that is currently being processed (the video frame in the visual representation of the schedule that the pointer 126 is pointing to.) In one example, the scheduled frame types include at least crosstalk reduction frame types and image frame types. In one example, modification information is associated with the frame type information to provide information on whether the frame type is selected for output with no modification or whether the frame type is modified. Further, if the frame type is to be modified—how each frame type is modified. For example, if the frame type is a crosstalk reduction frame—the image frame might be modified to be a uniform black frame, where the black frame is output in the output video stream for display.

In one example, the scheduler 117 of the output video frame selection component 112 includes modification information 119, timing information 118, frame type information 120, and sequence order information 122 which the scheduler 117 uses to determine whether input image frames are modified, how the input frames are modified, when the modified or unmodified frames are output, and the sequence order that the frame types are output. In one example, the sequence order information 112 provides information to the modification component 114 of the order and frame type that the video frames are output. In the example shown in FIG. 1, the output video sequence can be described generally as at least one crosstalk reduction from followed by a sequence of n image frames. In the example shown in FIG. 1, the repetitive pattern 138 is a pattern of alternating crosstalk reduction frames and image frames. However, the output video sequence could be different dependent upon the desired output and results. For example, the video sequence could be a crosstalk reduction frame followed by three image frames. This video sequence may be preferred where the video sequence is displayed as the increased number of image frames in the sequence compared to the first example (single crosstalk reduction frame followed by a single image frame), improves the quality of the displayed image.

In one example, the timing information 118 provides information regarding when and how often the selected (where schedule pointer 126 is currently pointing to) video frame is output. In one example, the timing information 118 is used to determine when a synchronization output signal 124 is output. The synchronization output signal 124 should correspond to the timing of the output of the crosstalk reduction frame.

FIG. 2 shows the video sequence control system shown in FIG. 1 where the output video frame sequence frames are displayed on a see-through display screen 150 according to an example of the invention. In the example shown in FIG. 2 the video sequence control system 100 outputs a video frame sequence 136 to the projector 148 that drives the display 150. The video sequence control system 110 outputs a synchronization output signal 124 to the image capture device 146 to signal to the image capture device 146 when image capture of the scene should occur.

The video sequence control system 100 acts as a specialized video processor. It can modify frame rate by inserting or removing frames and can modify image frames. In one example, the video sequence control system is a standalone device positioned between the video source 110 and the devices that it is outputting video frames and/or synchronization signals to. For example, in FIG. 2 the video sequence control system 100 is positioned between the video source 110 and the projector 148. Also, the video sequence control system 100 is positioned between the video source 110 and the video camera 146.

In one example, the crosstalk reduction frame 112 is a dimmed or reduced intensity frame, by dimmed or reduced intensity we mean the crosstalk reduction frame has an intensity lower than the corresponding image frames in the same video sequence. In the example shown in FIG. 2, the crosstalk reduction frames are black frames. The purpose of the lower intensity video frame is to provide a time interval when the image capture device 120 is capturing a video frame image of the scene behind the see-through display screen which minimizes the interference or crosstalk caused by the projected image.

In the example shown in FIG. 2, the video frame output 136 is projected onto a display screen 150 by a projector 148. In one example, the display is a see-through display screen 150 comprised of a relatively low concentration of diffusing particles embedded within a transparent screen medium. The low concentration of diffusing particles allows a camera 146 or other image capture device to capture an image through the screen 150 (providing that the subject is well lit), while diffusing enough of the light from the projector 148 to form an image on the display screen. In another example, the display screen 150 can be a holographic film that has been configured to accept light from the projector 148 within a first range of angles and to transmit light that is visible to the remote participant within a different range of viewing angles. The holographic film is otherwise transparent. In both examples, light projected onto the first surface 156 within the first range of angles can be observed by viewing the second surface 158, but light striking the second surface 158 is transmitted through the screen to the camera. In both examples the camera also captures light from the projector diffused or scattered off of the first surface.

In the example shown in FIG. 2, the output crosstalk reduction frames (e.g. 142*a*, 142*b*) are black frames (no light output) which simulates the projector 108 being in an off state. In one example, the image capture device 146 is a video camera. The video camera is synchronized to capture an image during the time period when the crosstalk reduction frame is being displayed. For the case where there is a see-through display screen, the video camera 146 captures the scene in front of the display screen, the display and the scene behind the see-through display screen. Thus, for a video conferencing example where there is a participant 152 on the other side of the display screen—the video camera 146 captures the image of the participant on the other side of the display screen. Because the projector is off when the image is captured, the camera does not capture the projected image.

Referring to FIG. 2, the video sequence control system 100 produces a synchronization output signal 124. The synchronization output signal 124 is communicatively coupled to an image capture device 146 and is used to provide a signal to the image capture device 146 related to the occurrence of the at least one crosstalk reduction frame (e.g. 142*a*, 142*b*). The synchronization output signal 124 is used to trigger image acquisition by the image capture device in order to capture an image when a crosstalk reduction frame 142 is being projected.

In one example, the synchronization output signal 124 is directly coupled to the image capture device 146. In the example shown in FIG. 2, the image capture device is communicatively coupled to the synchronization output signal via an optional signal converter 154. In one example, the signal converter could reduce the frequency of the synchronization trigger frequency. In another example, a image capture device 146 might require a specific signal pattern that follows an industry standard protocol. For this case, the signal converter 154 could translate a simple triggering synchronization output signal 124 to the pattern according to industry standard protocol.

In one example, the synchronization output signal 124 provides both a synchronization signal and a command signal to the image capture device 146. In one example, the synchronization output signal 124 provides information to the image capture device of when the crosstalk reduction frame is being projected. The command signal line can provide information to the image capture device of what camera function is to perform. In one example, the command signal to the image capture device provides a command to the image capture device to open or close its shutter. In the example shown in FIG. 2, the timing of the image acquisition is done in synchronization with the projection of the crosstalk reduction frame.

In one example, a synchronization output signal 124 is sent to the image capture device 146 to instruct it to open its shutter (take a picture) when the crosstalk rejection frames are projected onto the display screen. For example, assuming the black crosstalk reduction frame 142a is projected at a time $t_{proj1}$. Then the camera opens its shutter at this time, captures an image and outputs a corresponding photograph 160a. The corresponding photograph is of the display, the scene in front of the display and for the case of a see-through screen, the viewer behind the display screen. Similarly assuming a second black crosstalk rejection frame 142b is projected at time $t_{proj2}$, then the camera opens its shutter at this time, captures an image and outputs the corresponding photograph 160b.

Figure 3A:
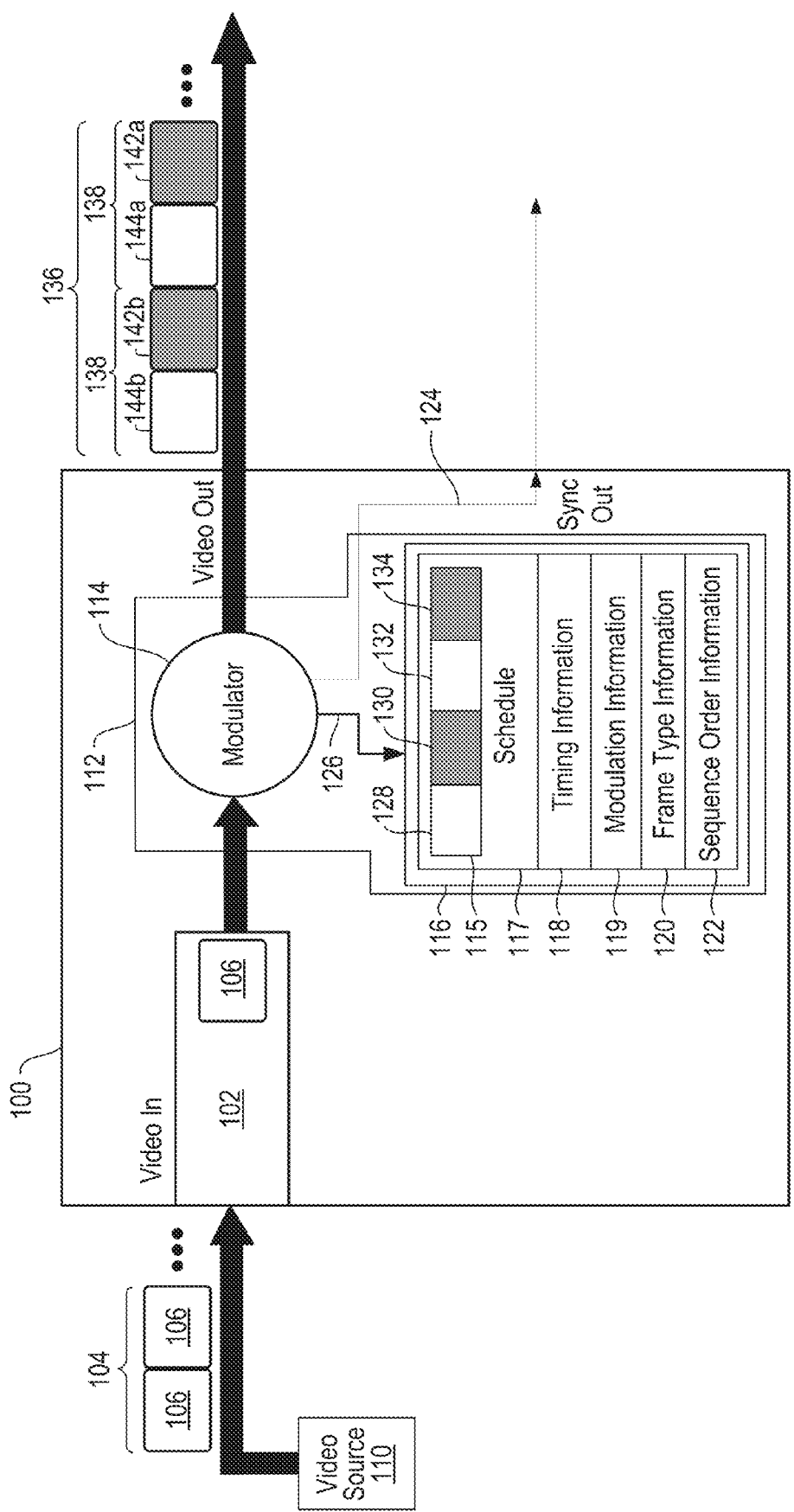
FIG. 3A shows a schematic drawing of a video sequence control system with spatial masking and modulation having a first modulation pattern according to an example of the invention.

FIG. 3A shows a schematic drawing of a video sequence control system shown in FIG. 1 with an alternative modulation pattern according to the schedule. The modulation component 114 of the video sequence control system 100 takes an input video and generates output video by dropping video frames, repeating video frames, or inserting dimmed, masked or otherwise modulated images. Similar to the example shown in FIG. 1, the modulation pattern shown in the visual representation of the schedule in FIG. 3A alternates between the image frame and a crosstalk reduction frame. However, instead of a black crosstalk reduction as shown in FIG. 1—the crosstalk reduction frame in FIG. 3A is modulated to output a gray frame.

In one example, instead of the crosstalk reduction frame having the highest possible darkness or intensity value (100%)—a black frame, a dimmed image may be implemented. For example, a gray image having some percentage of the possible intensity range. For example, the gray crosstalk reduction frame could have an intensity of 50%. In another example, the dimming can be applied at continuous varying levels. For example, the modified output video could consist of modulated versions of the input video frames where the modulated versions of the input video frames are at 75%, 50% and 25% of the intensity of the input image.

In another example, the darkness of the crosstalk reduction frame might be reduced from its highest possible intensity (black) to a lower intensity level. One case where this might be a reasonable option would be the case where the projected image frames are likely to be very bright. For the case where the projected images go between a very bright projected image to a black video frame (the crosstalk reduction frame), the high amount of change between the two projected images that the human eye perceives—increases the perception of flashing and flicker. To reduce this effect, in one example, the crosstalk reduction frame color could be changed from black to a gray color (lower intensity value.) In another example, where the display screen is not bright (in some cases where a see-through display is used), it is not necessary to have the crosstalk reduction frame be completely black in order to substantially reduce crosstalk. In one example, fully software-controllable dimming allows crosstalk reduction to be turned on/off or to vary continuously between zero and full. In the example shown in FIG. 1, the crosstalk reduction frame 112 is a black frame (uniform distribution of black pixels across the video frame.) In another example, the color or intensity value of pixels can be applied in a spatially varying fashion across the modulated frame.

Figure 3B:
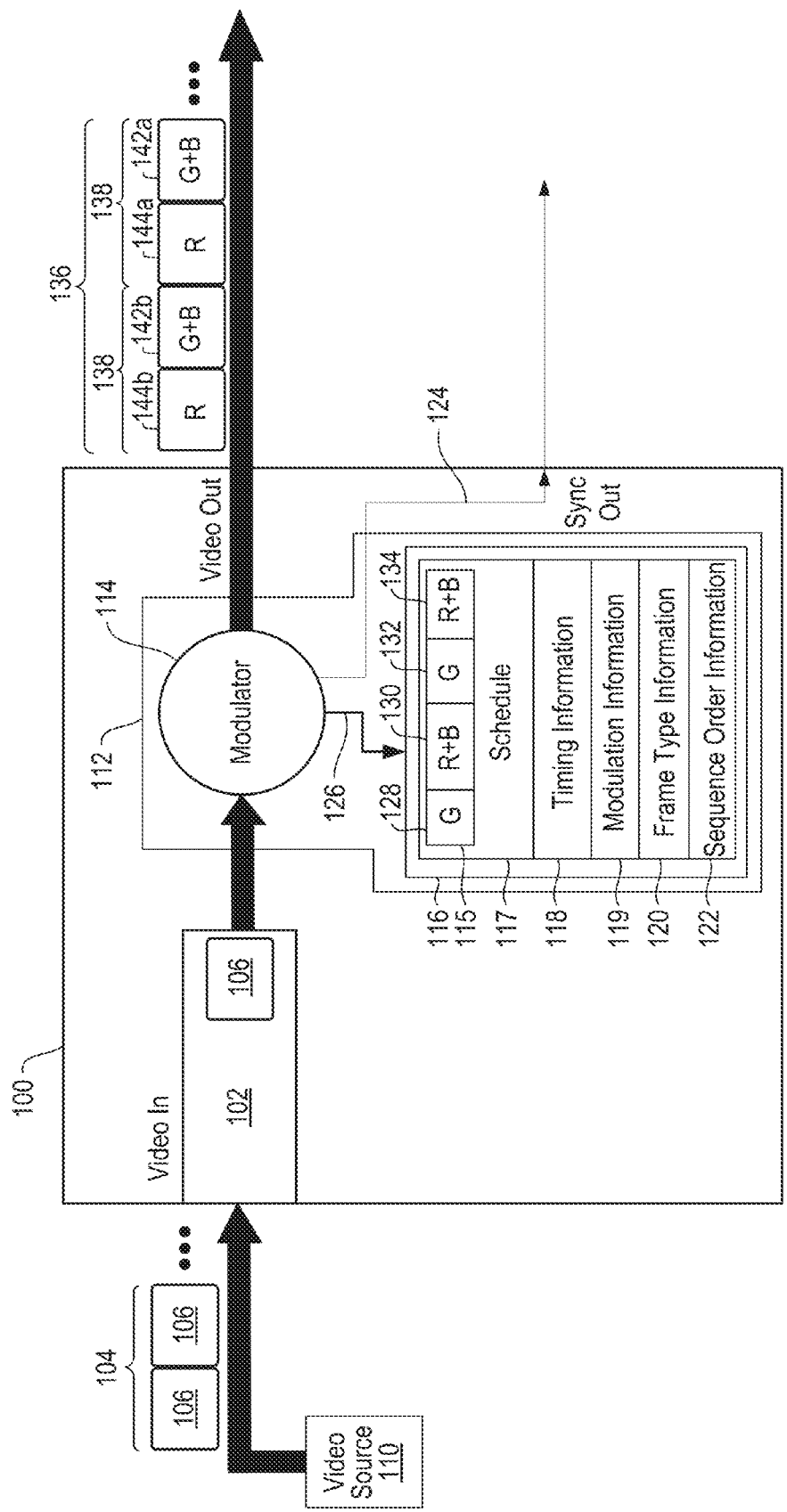
FIG. 3B shows a schematic drawing of a video sequence control system with spatial masking and modulation having a second modulation pattern according to an example of the invention.

FIG. 3B shows a schematic drawing of the video sequence control system 100 shown in FIG. 3A having a second alternative modulation (or masking) pattern. Both the modulation pattern shown in FIGS. 3A and 3B apply dimming to the video frame according to the schedule 117, however, the image frames are modulated according to a schedule that applies dimming to each color channel of the multichannel input video frames. In one example, dimming can be applied uniformly to each color channel. In another example, dimming can be applied at a different level to each color channel. In another example, dimming can also be applied differently to each channel of multi-channel video frames. For example, in one implementation dimming could be applied only to the red channel of the video frames.

One potential application of the video output sequence 100 shown in FIG. 3B is to use the video output to effectively perform "green-screening" techniques using the video output frames. Assume for purposes of example, the video sequence control system 100 shown in FIG. 2 where the video sequence control system outputs a video output sequence 136 on a display screen 150. In one example, assume that the display screen 150 is opaque and that a weatherman is standing in front of the display screen while a video camera is capturing the weatherman standing in front of a green display screen. Previous use of the green-screening techniques may have been to cut out the image of the weatherman and recomposite the weatherman in front of a weather map afterwards. However, it may be desirable for the weatherman to be able to see the display as a TV viewer would see it—instead of seeing a green display screen.

In one example, instead of taking video of the weatherman standing in front of a green screen display, the weatherman is photographed standing in front of a weather map. The modulation pattern shown in the schedule in FIG. 3B, for example, could be implemented by scheduling a green channel in one time slot (frame 128). The image of the weatherman could be captured against the green channel and in the next time slot the image of the weatherman could be captured against the combined blue and red color channel (frame 130). In the first time slot, the video camera captures an image of the weatherman in front of the green backdrop. In the second time slot, the camera captures an image of the weatherman in front of a combined blue and red backdrop. As long as frame rate of the video output is sufficiently high, the viewer's eyes average the green, blue and red channels so that the viewer sees a full color weather map.

In image processing, there are advantages to using more than one color channel background—for example when you are trying to subtract out a person standing in front of a background. In one example, the image is modulated to present different color video frames that can be used as different backdrops when performing image processing. For example, if an image is captured of a person against a black background and the person is wearing a black jacket—the black jacket will not show up well in the captured image. However, if an image of the same person is against a green background—the black jacket will show up. Alternating image capture against at least two substantially different color backgrounds—means no matter what color the person is wearing, for example, it will be easy to determine all of the colors in the image.

Figure 3C:
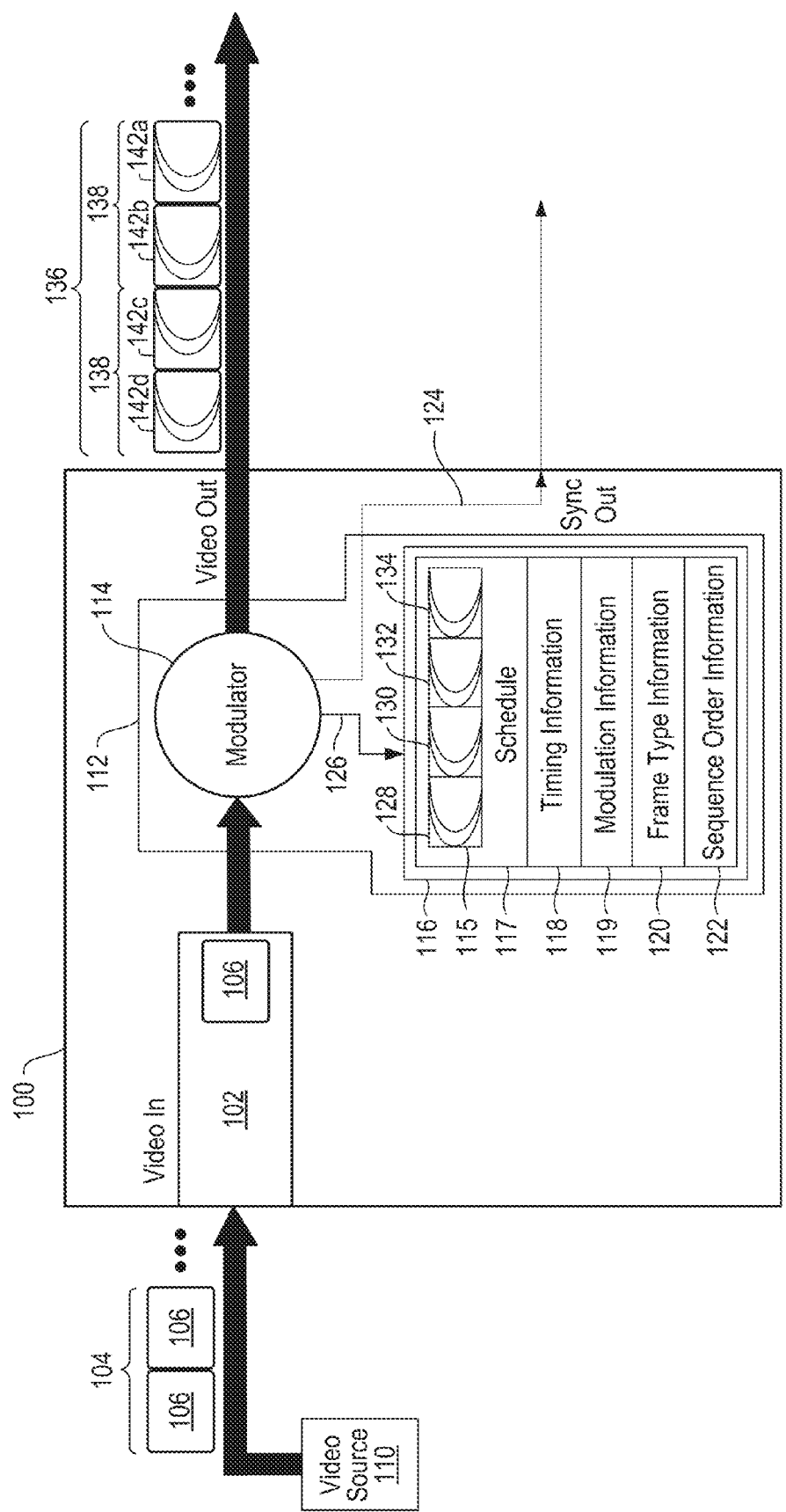
FIG. 3C shows a schematic drawing of a video sequence control system with spatial masking and modulation having a third modulation pattern according to an example of the invention.

FIG. 3C shows a schematic drawing of the video sequence control system 100 shown in FIG. 3A having a third alternative modulation pattern. In the example shown in FIG. 3C, the video frame output 136 is comprised of modulated image frames where the modulation occurs according to a schedule 117 that has a pattern that varies in a spatially varying manner. In the example shown in FIG. 3C, the third modulation pattern shown in the visual representation 115 of the schedule 117 is a crescent shaped pattern that is used as a mask to create a crescent shaped pattern on the input image frame. In one example, the mask is used to perform both spatial masking and color channel masking. For example, for the pattern shown in FIG. 3C, the crescent shaped area could be green while the areas outside of the crescent shape could be blue.

Figure 3D:
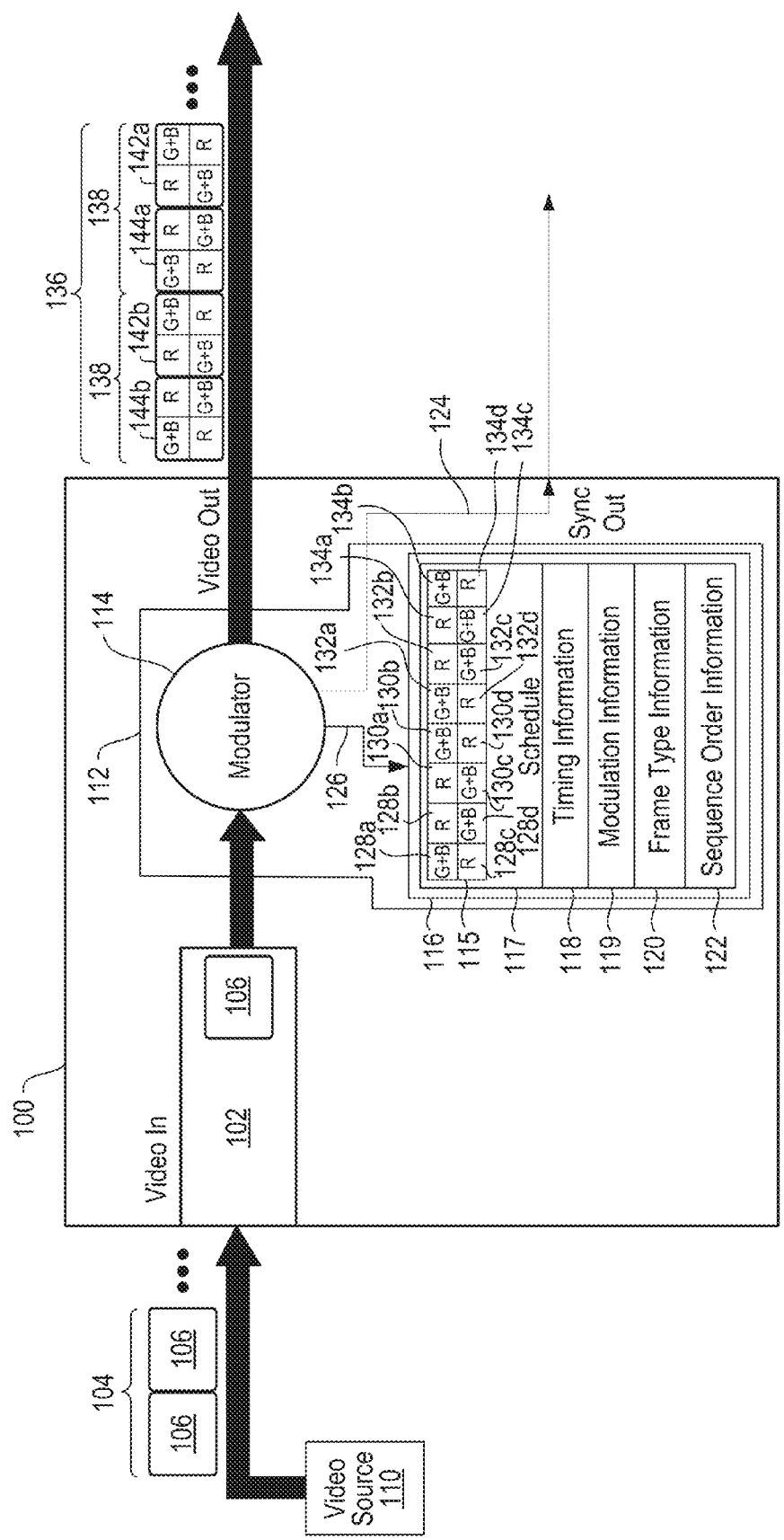
FIG. 3D shows a schematic drawing of a video sequence control system with spatial masking and modulation having a fourth modulation pattern according to an example of the invention.

Although the shape in FIG. 3C is a crescent shape, other shapes and patterns could be used. For example, referring to FIG. 3D the schedule 117 shows a modulation pattern that instead of dividing the frame into crescent shaped regions—divides each frame into four rectangular regions. FIG. 3D shows a schematic drawing of a video sequence control system shown in FIG. 3A having a fourth alternative modulation pattern. In the example shown in FIG. 3D, each of the four rectangular regions 128*a*-*d*, 130*a*-*d*, 132*a*-*d* and 134*a*-*d* have two different color channels—two rectangular regions having a red color channel (represented by the letter "R") and two rectangular regions having a combined green+blue color channel (represented by the letters G+B). In the example shown in FIG. 3D, two sequential frames alternate color patterns so that similar to the example described with respect to FIG. 3B, the color patterns alternate to provide all of the colors (RGB) within two sequential frames—so that the viewer sees the full color palate.

For purposes of example, consider the two sequential video frames in the schedule video frames 128 and 130. Each of the video frames in the schedules has four rectangular regions 128*a*-128*d* and 130*a*-130*d*. Each of sequential video frames have two rectangular regions having a red color channel (128*b*, 128*c* and 130*a*, 130*d*) and two rectangular regions having a combined green+blue color channel (128*a*, 128*d* and 130*a*, 130*d*). The color patterns of the two sequential video frames alternate—for example, if the color channel is red in video frame 128, it is combined green+blue in video frame 130 and vice versa. Thus, video frame region 128*b* is red and in its next (sequential) video frame the video frame region 130*b* is combined+blue. Similarly, video frame region 128*a* is green+blue, while the corresponding sequential video frame 130*a* is red. Similar to the alternating color channel video frames in FIG. 3B, the result of the pattern of alternating regions in the video frames video is that the viewer of the video output sequence 136 sees the full color palate of the input video frame images 104.

Figure 4:
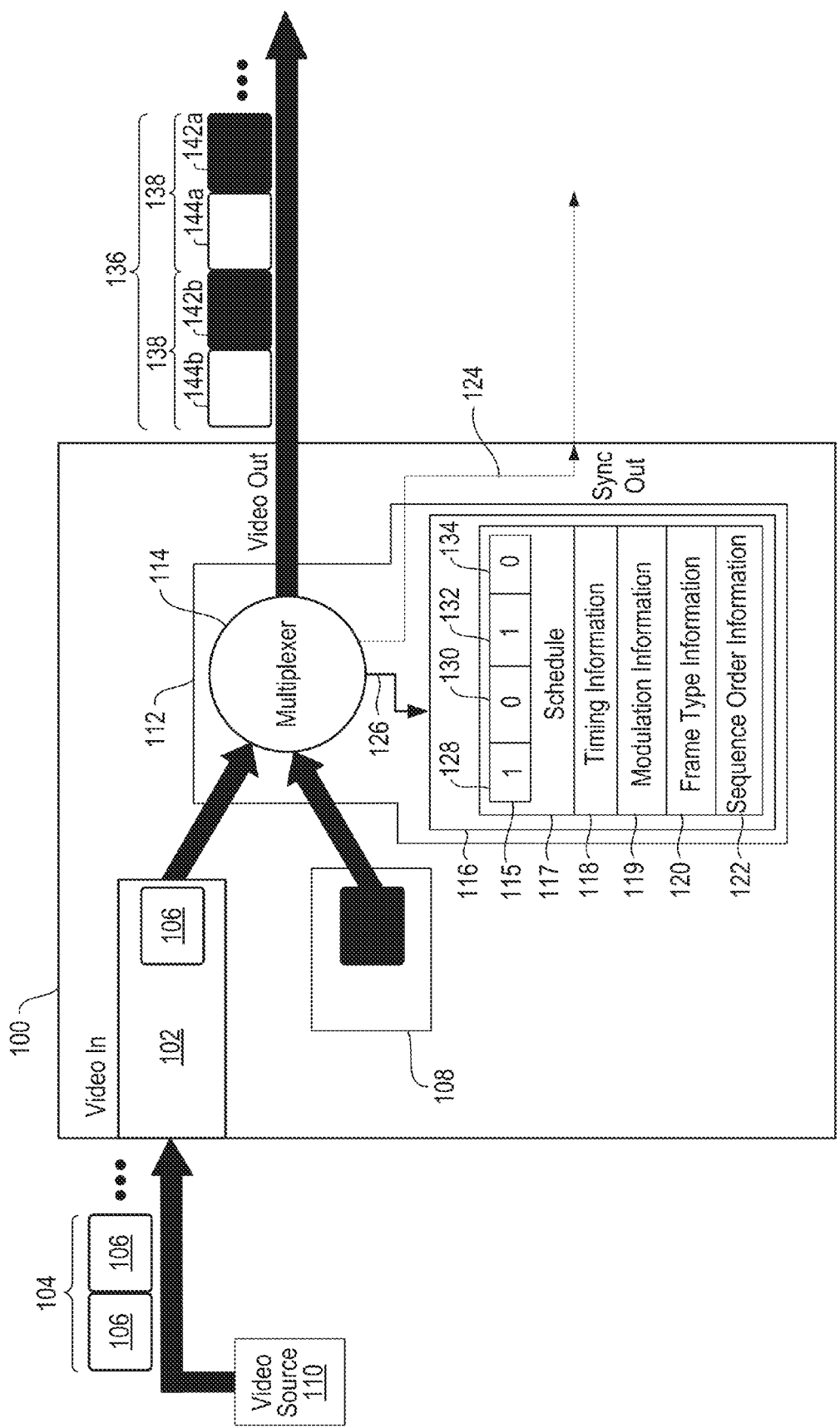
FIG. 4 shows a schematic drawing of a video sequence control system according to an example of the invention.

FIG. 4 shows a schematic drawing of a time multiplex control system with binary modulation according to an example of the invention. Similar to the configuration shown in FIG. 1, the configuration shown in FIG. 3 includes an input video frame buffer 102 for receiving a video stream 104 of input video frames 106 from a video source 110 and an output selection component 112 for determining video frames to be output according to a schedule. However, instead of the output selection component 112 being implemented using a modulator for modifying the input video stream, the output selection component is implemented using a multiplexer that selects the appropriate input from either the input video frame buffer 102 or the crosstalk reduction buffer 108. In contrast to the implementation shown in FIG. 1 which modifies the input video stream to create a desired crosstalk reduction video frame, the implementation shown in FIG. 4 stores the desired crosstalk reduction video frames in a crosstalk buffer. Thus, compared to the configuration shown in FIG. 1, a crosstalk reduction frame buffer is added in FIG. 4.

Referring to FIG. 4, in one example the output selection component 112 includes a multiplexer 114 which selects a particular frame type for output. The multiplexer has as possible inputs: video frames from the input frame buffer 102 or crosstalk reduction frames from the crosstalk reduction frame buffer 108. Based on the schedule 115, the multiplexer 114 chooses which video frame from which input buffer (input frame buffer or crosstalk reduction buffer) will be selected for output. In one example, the multiplexer 114 is implemented in hardware, software or a combination of the two.

Figure 5:
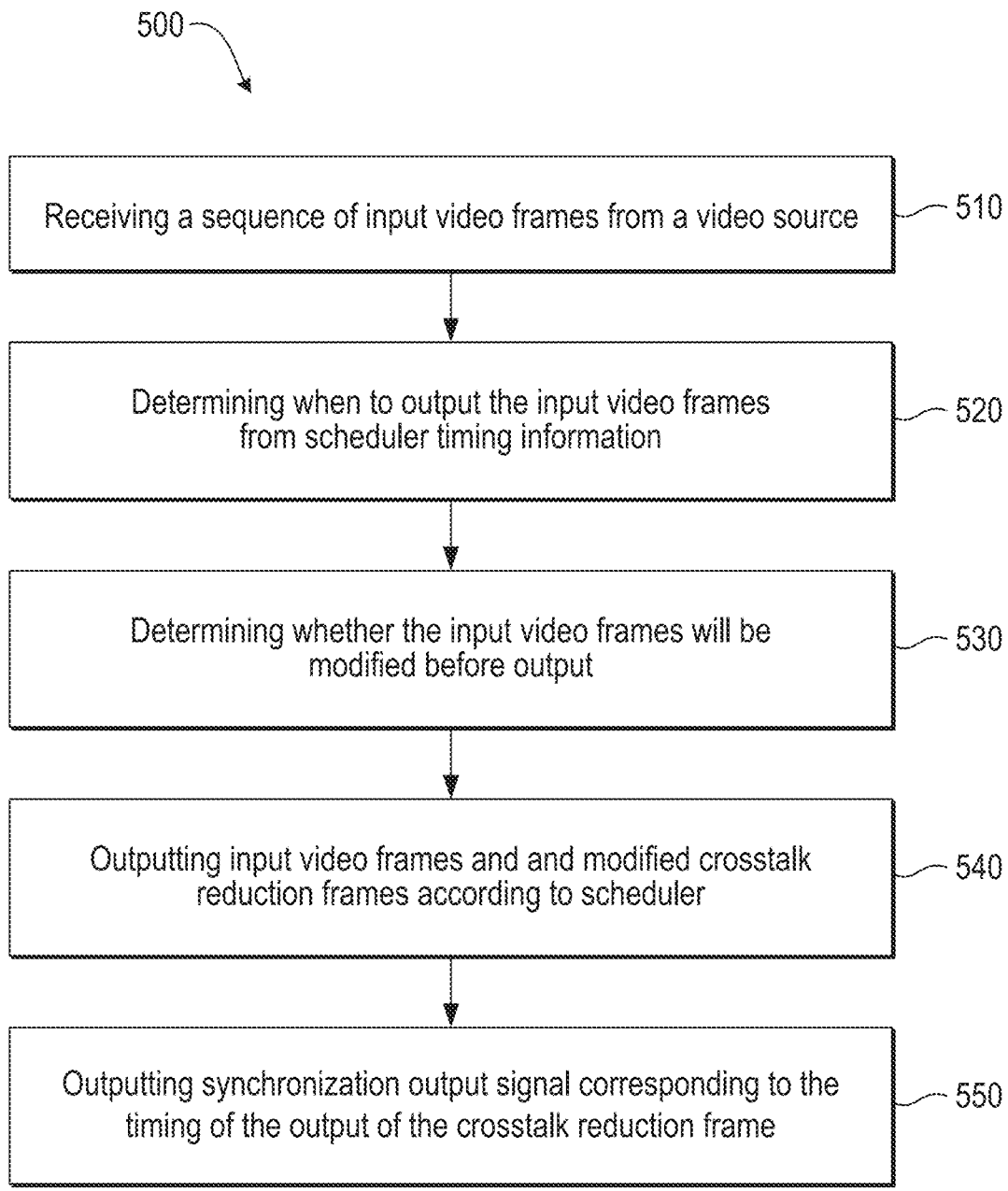
FIG. 5 shows a flow diagram for a method for controlling the output of a video sequence according to an example of the invention.

FIG. 5 shows a flow diagram for a method for controlling the output of a video sequence according to an example of the invention. The method includes the steps of: receiving a sequence of input video frames from a video source (step 510); determining when to output the input video frames from timing information provided to a scheduler 116 of the output selection component (step 520); determining whether the input video frames will be modified based on scheduler modulation information, wherein modulation information varies dependent upon the frame types available to be output, wherein the available frame types include at least image frames from the input video frame buffer 102 and crosstalk reduction frames (step 530); outputting the at least input video frames and modified crosstalk reduction frames according to the scheduler (step 540); and outputting an synchronization output signal 124, wherein the synchronization output signal corresponds to the crosstalk reduction frame (step 550).

Figure 6:
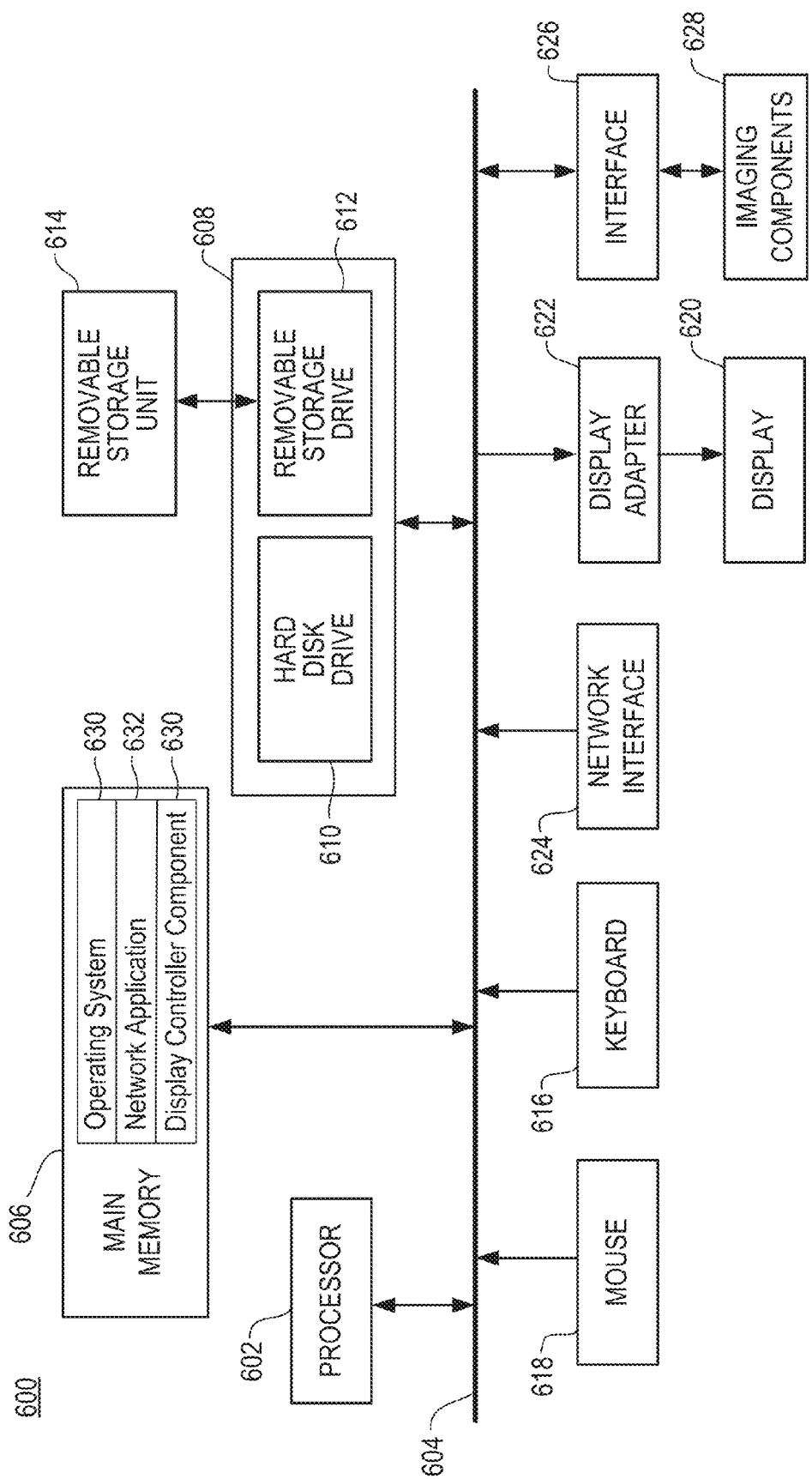
FIG. 6 shows a computer system for implementing the method shown in FIG. 5 described in accordance with examples of the present invention.

FIG. 6 shows a computer system for implementing the methods shown in FIGS. 5A and 5B and described in accordance with the examples herein. The computing apparatus 600 includes one or more processor(s) 602 that may implement or execute some or all of the steps described in the method 400. Commands and data from the processor 602 are communicated over a communication bus 604. The computing apparatus 600 also includes a main memory 606, such as a random access memory (RAM), where the program code for the processor 602, may be executed during runtime, and a secondary memory 608. The secondary memory 608 includes, for example, one or more hard drives 610 and/or a removable storage drive 612, representing a removable flash memory card, etc., where a copy of the program code for the method 400 may be stored. The removable storage drive 612 reads from and/or writes to a removable storage unit 614 in a well-known manner.

These methods, functions and other steps described may be embodied as machine readable instructions stored on one or more computer readable mediums, which may be non-transitory. Exemplary non-transitory computer readable storage devices that may be used to implement the present invention include but are not limited to conventional computer system RAM, ROM, EPROM, EEPROM and magnetic or optical disks or tapes. Concrete examples of the foregoing include distribution of the programs on a CD ROM or via Internet download. In a sense, the Internet itself is a computer readable medium. The same is true of computer networks in general. It is therefore to be understood that any interfacing device and/or system capable of executing the functions of the above-described examples are encompassed by the present invention.

Although shown stored on main memory 606, any of the memory components described 606, 608, 614 may also store an operating system 630, such as Mac OS, MS Windows, Unix, or Linux; network applications 632; and a display controller component 630. The operating system 630 may be multi-participant, multiprocessing, multitasking, multi-threading, real-time and the like. The operating system 630 may also perform basic tasks such as recognizing input from input devices, such as a keyboard or a keypad; sending output to the display 620; controlling peripheral devices, such as disk drives, printers, image capture device; and managing traffic on the one or more buses 604. The network applications 632 includes various components for establishing and maintaining network connections, such as software for implementing communication protocols including TCP/IP, HTTP, Ethernet. USB, and FireWire.

The computing apparatus 600 may also include an input devices 616, such as a keyboard, a keypad, functional keys, etc., a pointing device, such as a tracking ball, cursors, mouse 618, etc., and a display(s) 620. A display adaptor 622 may interface with the communication bus 604 and the display 620 and may receive display data from the processor 602 and convert the display data into display commands for the display 620.

The processor(s) 602 may communicate over a network, for instance, a cellular network, the Internet, LAN, etc., through one or more network interfaces 624 such as a Local Area Network LAN, a wireless 402.11x LAN, a 3G mobile WAN or a WiMax WAN. In addition, an interface 626 may be used to receive an image or sequence of images from imaging components 628, such as the image capture device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A video sequence control system comprising:
   an input video frame buffer to receive, at a first frame rate, an input video stream having a plurality of input video frames from a video source;
   a scheduler; and
   a modulator to:
     generate an output video stream based on the input video stream, wherein the output video stream includes the input video frames from the input video frame buffer and functional frames;
     determine a video frame of output video stream to be output according to timing information and modulation information provided by the scheduler, wherein the timing information includes information regarding when the video frame is to be output, wherein the modulation information varies dependent upon the frame types available to be output, wherein the available frame types include the input video frames and the functional frames; and
     output, at a second frame rate different from the first frame rate, the output video stream to a projector based on a pattern defined by the scheduler, wherein the video sequence control system is to output a synchronization output signal to an image capture device, and wherein the synchronization output signal indicates a timing of the output of the functional frames.

2. The video sequence control system recited in claim 1 wherein the modulator to modify the input video frames from the input video frame buffer.

3. The video sequence control system recited in claim 2 wherein responsive to the scheduler and the modulation information, the modulator determines whether an input video frame is to should be modified before output.

4. The video sequence control system recited in claim 1 further comprising a functional frame buffer to store at least a copy of the functional frame, wherein the copy of the functional frame stored in the functional frame buffer is inserted into the output video stream according to the pattern defined by the scheduler.

5. The video sequence control system recited in claim 1 wherein the functional frame is a crosstalk reduction frame, wherein the functional frame is a dimmed version of a corresponding input video frame.

6. A video sequence control system comprising:
   an input video frame buffer to receive, at a first frame rate, a video steam having a plurality of input video frames from a video source;
   a scheduler; and
   a modulator to:
     generate an output video stream based on the input video stream, wherein the output video stream includes the input video frames from the input video frame buffer and functional frames;
     determine a video frame of the output video stream to be output according to a scheduler that provides timing information and modulation information provided by the scheduler, wherein the timing information includes information regarding when each video frame of the output video stream is to be output, wherein the modulation information provides information on how to modify the color and spatial pattern of the input video frames; and
     output, at a second frame rate different from the first frame rate, the output video stream to a projector, wherein the video sequence control system is to output a synchronization output signal to an image capture device, and wherein the synchronization output signal indicates a timing of the output of the functional frames.

7. The video sequence control system recited in claim 6 wherein the modulation information includes a mask to modify the input video frame, wherein the color channel of the mask varies in time.

8. The video sequence control system recited in claim 6 wherein the modulation information includes a mask to modify the input video frames, wherein the color channel of the mask varies in space.

9. The video sequence control system recited in claim 6 wherein the modulation information includes a mask to modify the input video frames, wherein the color channel of the mask varies both in time and space.

10. A method of controlling the output of video frames, comprising:
    receiving, at a first frame rate, a sequence of input video frames from a video source at an input video frame buffer of a video sequence control system;
    determining when to output the input video frames based on timing information provided by a scheduler of an output selection component of the video sequence control system;
    determining whether the input video frames are to be modified before output based on modulation information provided by the scheduler, wherein the modulation information varies dependent upon the frame types available to be output, wherein the available frame types include the input video frames from the input video frame buffer and functional frames;

generating an output video stream based on the input video stream and the functional frames;

outputting, at a second frame rate different from the first frame rate, the output video stream to a protector based on a pattern defined by the scheduler; and outputting a synchronization output signal to an image capture device, wherein the output synchronization signal corresponds to a timing of the output of the functional frames.

11. The method recited in claim 10 wherein when a determination has been made to modify an input video frame stored in the input video frame buffer, a modulator in the video output frame selection component modifies the input video frame resulting in a functional frame for output.

12. The method recited in claim 10 wherein when a determination has been made not to modify an input video frame stored in the input video frame buffer, a multiplexer in the video output frame selection component selects a functional frame from a functional frame buffer for output.

13. The method recited in claim 10 wherein when a determination has been made not to modify an input video frame stored in the input video frame buffer, a software or hardware implemented description of the functional frame is output according to the pattern of the scheduler.

* * * * *